United States Patent [19]

Marche

[11] Patent Number: 4,681,282
[45] Date of Patent: Jul. 21, 1987

[54] DEVICE FOR THE DETECTION AND ELIMINATION OF UNWANTED IMAGES CREATED BY THE PYRAMIDAL IR DOME

[75] Inventor: Pierre Marche, Boulogne, France

[73] Assignee: U.S. Philips Corporation, New York, N.Y.

[21] Appl. No.: 770,339

[22] Filed: Aug. 28, 1985

[30] Foreign Application Priority Data

Aug. 28, 1984 [FR] France .................................. 84 13285

[51] Int. Cl.[4] .................................................. F41G 7/26
[52] U.S. Cl. .................................................... 244/3.16
[58] Field of Search ........................................ 244/3.16

[56] References Cited

U.S. PATENT DOCUMENTS

| | | | |
|---|---|---|---|
| 3,064,924 | 11/1962 | Fairbanks | 244/3.16 |
| 3,293,437 | 12/1966 | Boydell | 244/3.16 |
| 4,244,540 | 1/1981 | Vollmerhausen | 244/3.16 |

Primary Examiner—Charles T. Jordan
Attorney, Agent, or Firm—Thomas A. Briody; William J. Streeter; Gregory P. Gadson

[57] ABSTRACT

A device for the detection and elimination of unwanted images created by the pyramidal IR dome of an infrared auto-director for a missile which is not roll-stabilized and the analysis of whose field has as its result, a succession of frames of period T. According to the invention, the levels of the frame of rank $N-1$ preceding any frame of rank N are stored in a frame memory, the levels at two points corresponding to the same geographical localization of the scene at an instant t and at the instant $t-T$ are transmitted to the inputs of a differential detector, the absolute value of whose output level is compared with a threshold level. The output from the comparator provides a logic signal which is used to inhibit the taking into account of the unwanted image when the absolute value of the output level from detector is greater than the threshold value.

1 Claim, 8 Drawing Figures

DEVICE FOR THE DETECTION AND ELIMINATION OF UNWANTED IMAGES CREATED BY THE PYRAMIDAL IR DOME

BACKGROUND OF THE INVENTION

The invention is concerned with an electronic device for the detection and elimination of unwanted images created by the pyramidal IR dome of an infra-red auto-director (ADIR) for a missile which is not roll-stabilized, the signal collected in the focal plane of the objective of the auto-director and originating, either in the case of a first type, in a source located in the field of the said objective and whose radiation is transmitted through the IR dome, or in the case of a second type, in a source, external to the said field and whose radiation after transmission through a facet of the IR dome is reflected by the opposite facet.

The source located in the field of the objective (the origin of the first type) may be the useful target, an element of the landscape, a piece of "window", etc.

The source external to the field of the objective (the origin of the second type) may be an element of the landscape (including the sun), a piece of "window", etc.

The images which it is proposed here to eliminate are those corresponding to an origin of the second kind, whether they are elements of the landscape or pieces of "window", distinguishing between elements of landscapes and "window" not being the mask of the said device.

The theoretical remedy for the non-creation of such unwanted images consists in carrying out on the outer surface of each facet of the IR dome an anti-reflection treatment similar to that which is carried out on the inside surfaces. In practice, this remedy is ineffective owing to the fact that the treatments known to date do not stand up to the conventional conditions to which the IR dome is subjected.

The solution proposed is not an optical aid but an electronic device, the purpose of which is to detect and hence to eliminate these unwanted images.

This device is characterized in that the analysis of the scene delimited by the field of the objective having as its result a succession of frames of period T, the levels of the points on the frame of rank $N-1$ preceding any frame of rank N are stored in a frame memory, the levels of two points corresponding to the same geographical localization of the scene, one on frame N at an instant t, the other on frame $N-1$ at an instant $t-T$, being transmitted respectively to the non-inverting input and to the inverting input of a differential detector whose output is connected via an absolute-value measuring unit to an input of a comparator to whose other input is applied a threshold level with a positive value, the level emerging from the said measuring unit indicating the occurrence of an unwanted image if its value is greater than the said threshold value, the signal at the output of the comparator being used to inhibit the taking into account of the said unwanted image.

As has already been mentioned in the preamble, this device is intended for a missile which is not roll-stabilized. In other words it is an aid to picking-up in flight, renewed pick-up in flight and pursuit.

Provided the elementary duration of processing is limited to a sufficiently low value (e.g. a frame period of 5 ms) such that it is possible to ignore particularly the displacement of the missile (3.5 m at Mach 2), the relative target-missile displacement, and the enlargement of the target (less than an elementary field of 0.5 m radius for a target of diameter 2 m at the very short distance of 100 m), the images of the first type will remain identical, whereas the images of the second type will describe a trajectory during the same time.

BRIEF DESCRIPTION OF THE DRAWINGS

The following description read in conjunction with the attached drawings, all of which are given by way of example, will render it possible to understand how the invention can be implemented.

The numerical values used henceforth are given for guidance only and are derived from orders of magnitude corresponding to the application of this device to an ADIR with imagery for a ground-air missile with very short range.

The elements corresponding to each other in these various figures will be indicated by the same reference signs.

DETAILED DESCRIPTION OF THE INVENTION

Figure 1:
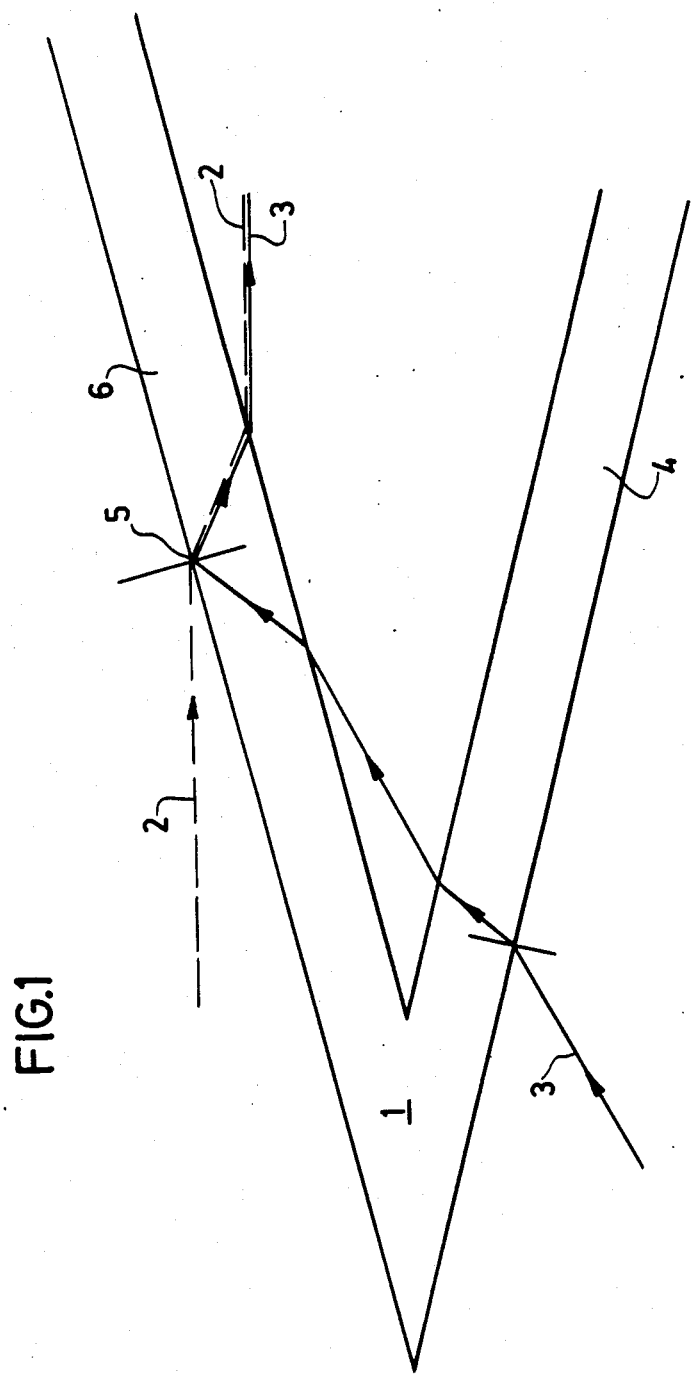
FIG. 1 shows the double origin of the signal transmitted by the pyramidal IR dome.

FIG. 1, representing the cross-section of our pyramidal IR dome 1 through its plane of symmetry, shows that the radiation transmitted can have two origins:

- a so-called origin of the first type, indicated by a broken line 2 in the figure, when it originates from a source situated in the field of the objective and whose signal is collected in the focal plane of the said objective after transmission through the IR dome;
- a so-called origin of the second type, indicated by a continuous line 3, when it originates from a source external to the field of the objective but whose flux transmitted through one of the facets 4 of the IR dome is then reflected by the outside surface 5 of the opposite facet 6. This radiation forms in the focal plane of the objective an unwanted image which is superimposed on the useful image.

Figure 2:
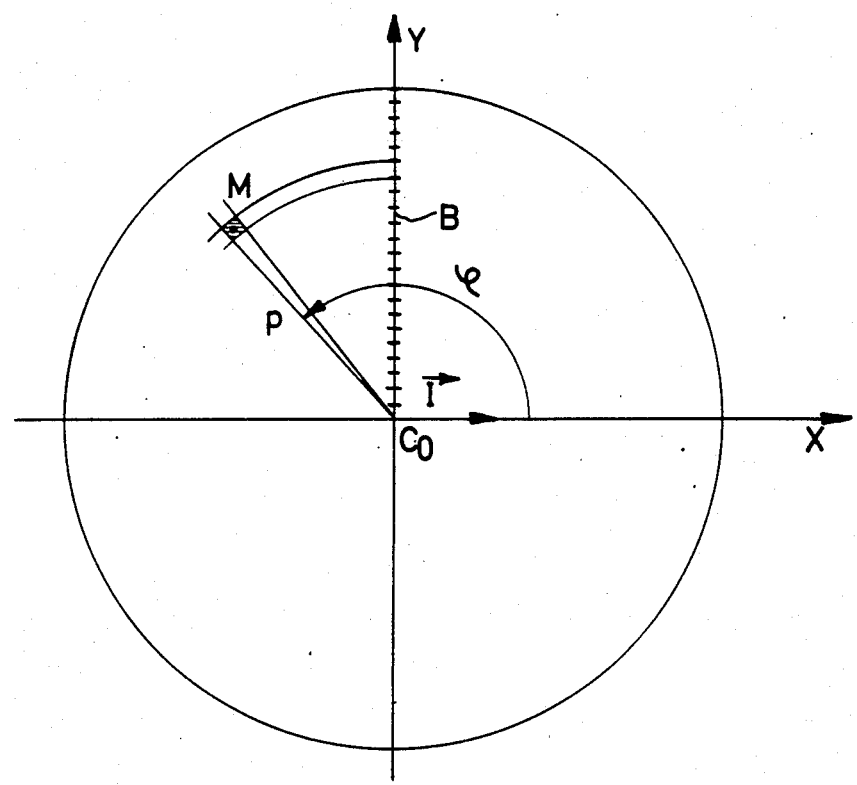
FIG. 2 shows a frame in the focal plane of the objective.

A complete analysis of the scene delimits the field of the auto-director in accordance with its characteristics (optical system, detectors, sweeping mode). The image thus obtained in the focal plane of the objective constitutes a frame shown in FIG. 2. The infra-red detectors arranged to form a row B of 32 elements translates the flux which they receive into an electrical signal. A prism turning at the level of the objective produces the rotation of the image in the plane of the scene. Each detector element thus analyzes a circular ring centred upon Co. The flux which it receives is integrated and read sequentially every 1/128 of a turn during a certain time depending on the speed of rotation. The frame thus broken down into 128 successive positions of the row of detectors, which is itself cut geographically into 32 elements, is made up of $128 \times 32 = 4096$ picture elements or pixels. One of these elements is shown around the point M with polar coordinates $\rho$ and $\phi$. If the sweep frequency is 200 rps, the period of the frame is 5 ms.

Figure 3:
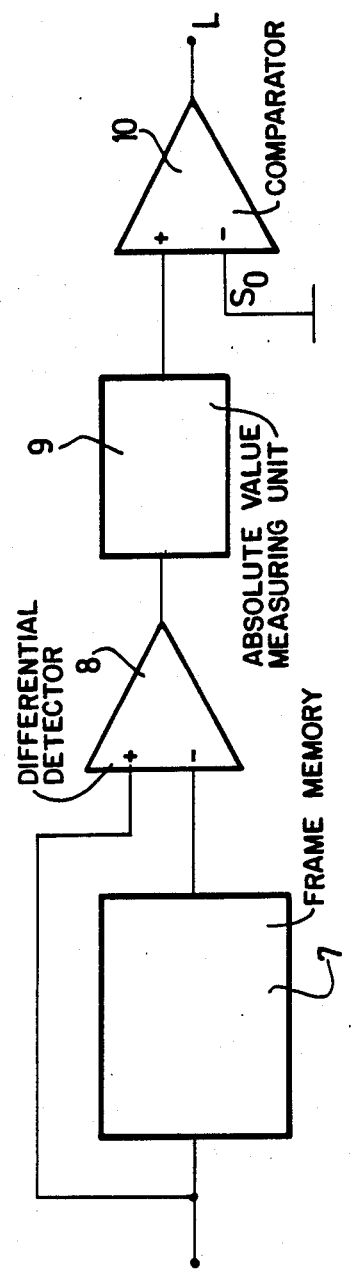
FIG. 3 shows the block diagram of the electronic device for the detection and elimination of unwanted images according to the invention.

The suppression of unwanted images is achieved, according to the invention, by means of the electronic device whose block diagram is shown in FIG. 3.

The levels of the signals corresponding to the various picture elements on the successive frames are transmitted to the inputs of a differential detector 8, directly to the non-inverting input and via a memory 7 to the inverting input. The memory 7, called the frame memory, is equivalent to a delay line with a delay equal to the duration of a frame period T. The output from the differential detector 8 is connected via an absolute-value measuring unit 9 to an input of a comparator 10 whose other input receives a threshold value $S_o$ which is positive and a function of the thermal-noise level of the device ($S_o = a\delta$; $a > 0$, $\delta$ being the signal-to-noise ratio). The output of the comparator delivers a logic signal L.

Processing is performed in real time. Frame number N being analyzed and the levels of the points of the preceding frame number $N-1$ having been stored in the frame memory 7, the differential detector 8 works out the point-to-point difference between the levels provided by the frames N and $N-1$. If the point N analyzed at moment t on the frame N provides the level S(t), the level of the same point stored in the memory was $S(t-T)$ on the frame $N-1$. At instant t, therefore, the calculation is $\Delta S(t) = S(t) - S(t-T)$ and the absolute value of $\Delta S(t)$ derived from 9 is compared in 10 with the threshold value $S_o$. If $|\Delta S(t)| \geq S_o b$, there is at point M a signal variation between the frame $N-1$ and the frame N, indicating the occurrence of an unwanted image. The logic signal $L = 1$ resulting from this comparison will be used to inhibit the taking into account of this information.

The condition whereby any development between two consecutive frames (with a short inter-frame period) characterizes an unwanted image (an origin of the second type) is a sufficient condition. It may not be a necessary condition.

In fact, taking into account the periodicity of the roll rotation on the one hand and the periodicity of the frame analysis on the other, an unwanted image may show the same trajectory in two consecutive frames.

This phenomenon is encountered when the analysis period is a multiple of the "trajectory period", which can be represented by:

$$[E1] \quad T = k/n_f w$$

where
T = the analysis period or frame duration
$n_f$ = the number of facets of the IR dome
w = the roll velocity
k = the integer associated with frame N For the following numerical application: T = 5 ms; $n_f = 8$; $5 \leq w \leq 15$ rps, which yields $0.2 \leq k \leq 0.6$, it will be checked that there is no whole number value of k satisfying the equation [E1]. There is therefore no risk of the aforesaid phenomenon occurring.

Figure 4:
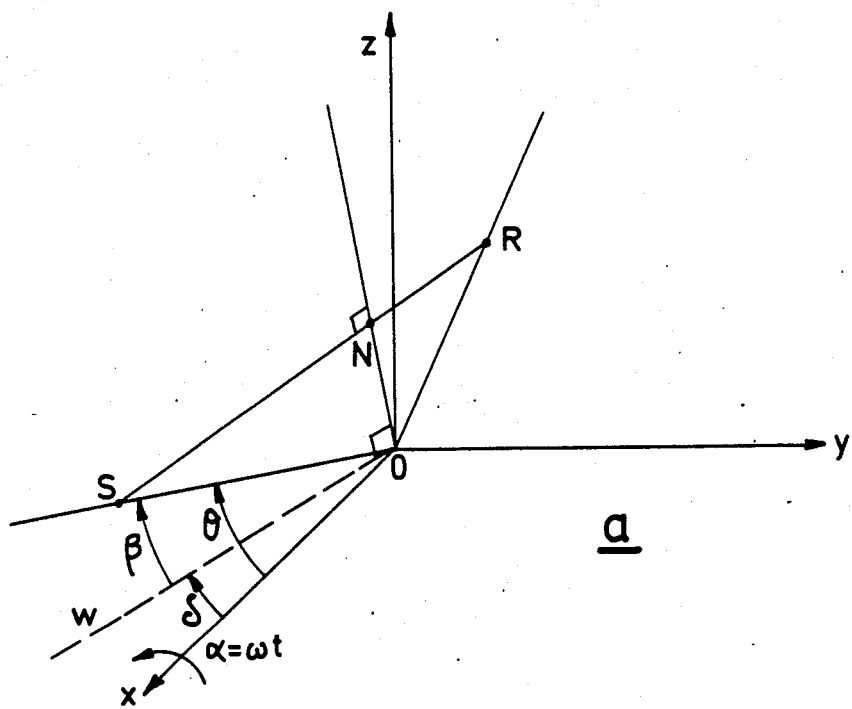
FIG. 4a defines the fixed reference system Oxyz and the reflection facet for determination of the generic points of the unwanted image.
FIG. 4b gives the same definitions in the xOz plane at the initial instant.
Figure 4:
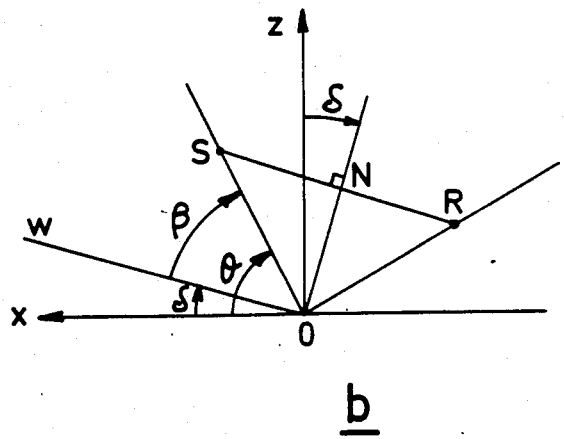

The elementary duration of the processing being limited to a low value of the order of the frame period, it has been shown above that the images of the second type describe a trajectory, the expressions for which it is now proposed to calculate. To that effect it will be assumed that the frame is stabilized in rolling, i.e. that the luminance data are addressed within a fixed reference system linked to the ground. At the practical level, this results from the use of a roll gyroscope and from the electronic compensation of the addressing performed in a datum point linked to the missile. The choice of the orientation of the axes is then more important that that of the origin, which may be arbitrary. FIG. 4a gives the definition of this reference system shown in perspective.

the axis x'Ox is the axis of the missile (Ox being directed towards the front);
the axis z'Oz is the vertical axis of the missile at $t = 0$ (Oz being directed upwards);
the axis y'Oy is the third coordinate axis of the reference system, Oxyz being fixed in space (roll-stabilized).

Also defined in FIG. 4a are the reflection facet and the directions of the incident and reflected rays.

At the initial instant, the reflection-facet plane is defined by two straight lines: the axis y'Oy and the straight line Ow, the intersection of the plane xOz with a plane parallel to the facet of the IR dome from which the radiation originating from the unwanted source is reflected. The straight line Ow makes an angle $\delta$ with the axis x'Ox.

When the missile performs a rolling movement, this reflection-facet plane turns through an angle $\alpha = wt$ about the axis x'Ox.

The direction of the incident beam is given by the straight line OS which makes an angle $\beta$ with the facet in the plane xOz.

In the reference system Oxyz,
the generic point S of the incident beam OS has as its coordinates: $x_S = A \cos \theta$, $y_S = 0$, $z_S = A \sin \theta$ with $\theta = \beta + \delta$ and A = OS: parameter;
the generic point N of the normal ON to the plane of reflection $\overrightarrow{SN}$ being perpendicular to ON has as its coordinates: $x_N = -B \sin \delta$, $y_N = -B \cos \delta \sin \beta$, $z_N = B \cos \delta \cos \beta$, with $B = A(\cos \delta \cdot \sin \theta \cdot \cos \beta - \sin \delta \cdot \cos \theta)$;
the generic point R of the reflected ray OR at the intersection of this ray with SN has its coordinates: $x_R$, $y_R$, and $z_R$, with $x_R = A \cdot A_1$, $y_R = A \cdot A_2$, $z_R = A \cdot A_3$ where $A_1$, $A_2$ and $A_3$ are functions of the trigonometrical lines of $\delta$, $\beta$ and $\theta$.

FIG. 4b shows the above definitions in the plane xOz at the initial instant.

Figure 5:
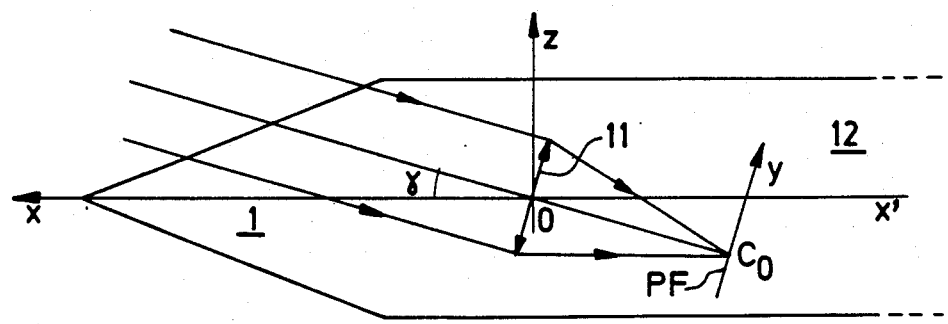
FIG. 5 shows the positioning of the fixed reference system on the inside of the missile in relation to the focal plane of the objective

In order to facilitate calculations, the center O of the fixed reference system Oxyz is positioned at the center of the optical system of the auto-director. In FIG. 5 this optical system is represented in simplified fashion by a lens 11 located in the body of the missile 12 contiguous to the pyramidal IR dome 1. Let $\gamma$ be the angle of sight, i.e. the clearance of the head of the auto-director or, in the simplified representation in the figure, the angle of the optical axis of lens 11 with the axis x'Ox of the missile. $C_o$ being the center of the field in the focal plane of the image PF at a distance F from the center O of the reference system, it will be assumed, for the sake of clarity, that at the initial instant the image is located on the vertical axis of symmetry $C_oY$ of the said plane, the horizontal axis $C_oX$ being parallel to $Oy$ (see also FIG. 2). The focal plane thus defined is addressed in copolar coordinates $\rho$, $\phi$ with $0 \leq \rho \leq 31$ and $0 \leq \phi \leq 127$ ($\rho = 0$ at the center of the field, $\rho = E$ [distance to the center [P] and $\phi = E[(128/2\pi) \times$ angle in radiants]); in these expressions $E[x]$ represents the function "rounded-off whole-number value of x" and $P = 62.5$ μm, the spacing between two detector elements in the row.

The coordinates of $C_o$ in the reference system $Oxyz$ are:

$x_{C_o} = -F \cos \gamma$,
$y_{C_o} = 0$,
$z_{C_o} = F \sin \gamma$

The equation of the focal plane PF is given by:

$(PF): x \cos \gamma - z \sin \gamma + F = 0$

The relation between the parameter A which enters into the expressions for the coordinates of the reflected generic point R and the focal line F is obtained by writing "R belongs to PF". This yields:

$$A = \frac{F}{A_3 \sin\gamma - A_1 \cos\gamma}$$

In the reference system $Oxyz$ of vectors of base $\vec{i}, \vec{j}$, and $\vec{k}$, the vector of $\overrightarrow{C_oR}$ has as its components:

$$\overrightarrow{C_oR} \begin{cases} A \cdot A_1 + F \cos\gamma \\ A \cdot A_2 \\ A \cdot A_3 - F \sin\gamma \end{cases}$$

In the focal plane, whose director vectors are $\vec{i} = \vec{j}$ and $\vec{J} = \sin\gamma\ \vec{i} + \cos\gamma\ \vec{k}$, the components of $C_oR$ are:

$X_R = A \cdot A_2$ $Y_R = A \cdot (A_1 \sin\gamma + A_3 \cos\gamma)$

Figure 6:
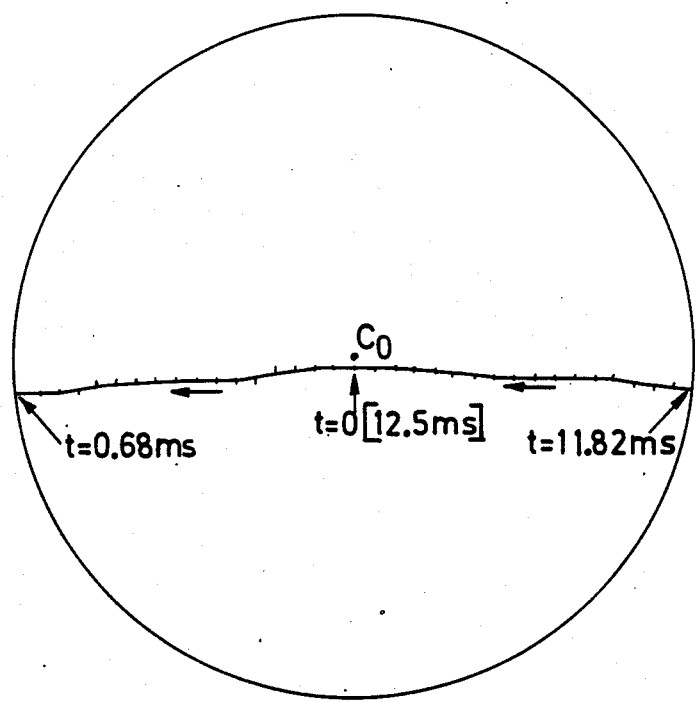
FIG. 6 shows the trajectory of an unwanted image within the limits of the field analyzed.

Thus the polar coordinates of an unwanted image R in the focal plane PF are written:

$\rho_R = E[\sqrt{(X_R^2 + Y_R^2)}/P]$ $\phi_R = E\left[\dfrac{128}{2\pi} \phi'_R\right]$ with $\phi'_R$ (rad) such that $\sin \phi'_R = \dfrac{Y_R}{\rho_R} \qquad \cos \phi'_R = \dfrac{X_R}{\rho_R}$ The trace of a trajectory of an unwanted image in the focal plane is given in FIG. 6 with the parameters values: $\theta = 28°$, $\beta = 14°$ at $t = 0$ and $\gamma = -0.05°$. It can be seen that the unwanted image located at $t = 0$ on the vertical axis of symmetry of the focal plane returns to its initial position after 12.5 ms or 2.5 frames. From $t = 0.68$ ms to $t = 11.82$ ms, the unwanted image is outside the field analyzed.

The corresponding frames are obtained from the sampling of these trajectories by the row of infra-red detectors subjected to a "polar-type" sweeping movement.

Figure 7:
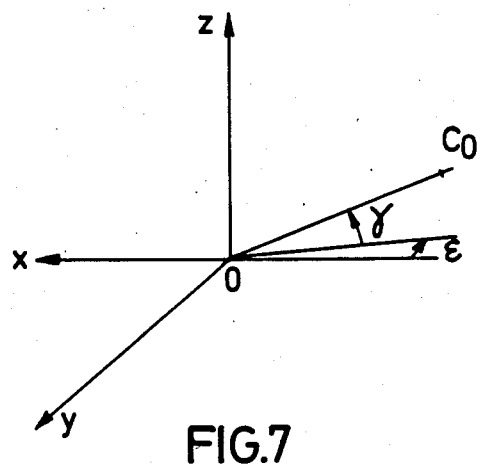
FIG. 7 defines the fixed reference system and the axis of sight for the general case in which no hypothesis is made concerning the existence of the unwanted image at $t=0$.

In the general case, no hypothesis is made a priori concerning the existence of the unwanted image at the initial instant. The focal plane is defined as the plane perpendicular to the axis of sight shown in FIG. 7 and given by its elevation $\gamma$ (taken as positive in the upward direction) and azimuth $\epsilon$ (taken in the trigonometric direction in the horizontal plane) and such that point $C_o$ (center of the field) is a distance F from the origin O.

The direction of the axis of sight is given by the vector $\overrightarrow{OC_o}$ with the components:

$$\overrightarrow{OC_o} \begin{cases} -F \cos\gamma \cos\epsilon \\ -F \cos\gamma \sin\epsilon \\ F \sin\gamma \end{cases}$$

The equation of the focal plane is then given by:

$(PF): \cos\gamma \cos\epsilon\ x + \cos\gamma \sin\epsilon\ y - \sin\gamma\ z + F = 0$.

The relation between the parameter A and the focal line F obtained as above by writing that R belongs to PF becomes:

$$A = \frac{F}{A_3 \sin\gamma - A_1 \cos\gamma \cos\epsilon - A_2 \cos\gamma \sin\epsilon}$$

In the trihedron $Oxyz$ with basic vectors $\vec{i}, \vec{j}$ and $\vec{k}$, vector $\overrightarrow{C_oR}$ has as its components:

$$\overrightarrow{C_oR} \begin{cases} A \cdot A_1 + F \cos\gamma \cos\epsilon \\ A \cdot A_2 + F \cos\gamma \sin\epsilon \\ A \cdot A_3 - F \sin\gamma \end{cases}$$

In the focal plane whose director vectors are:

$I = -\sin\epsilon\ \vec{i} + \cos\epsilon\ \vec{j}$ and $J = \sin\gamma \cos\epsilon\ \vec{i} + \sin\gamma \cos\epsilon\ \vec{j} + \cos\gamma\ \vec{k}$, the components of $C_oR$ are:

$X_R = A(A_2 \cos\epsilon - A_1 \sin\epsilon)$ $Y_R = A(A_1 \sin\gamma \cos\epsilon + A_2 \sin\gamma \sin\epsilon + A_3 \cos\gamma)$ The expressions for the polar coordinates $\rho_R$ and $\phi_R$ of the unwanted image R remain as indicated above.

What is claimed is:

1. An electronic device for the detection and elimination of unwanted images created by a pyramidal IR dome of an infra-red auto-director for a missile which is not roll-stabilized, a signal collected in the focal plane of an objective of the auto-director and originating either, in the case of a first type, in a source located in the field of the said objective and whose radiation is transmitted through the IR dome or, in the case of a second type, in a source external to the said field and whose radiation after transmission through a facet of the IR dome is reflected by an opposite facet, characterized in that, the analysis of the scene delimited by the field of the objective having as its result a succession of frames of period T, the levels of the points of the field of rank $N-1$ preceding any frame of rank N are stored in a frame memory, the levels of two points corresponding to the same geographical localization of the scene, one on the frame N at an instant t, the other on the frame N−1 at an instant t−T, being transmitted respectively to a non-inverting input and to an inverting input of a differential detector whose output is connected via an absolute-value measuring unit to an input of a comparator to whose other input is applied a threshold level with a positive value, the level emerging the said unit indicating the occurrence of an unwanted image if the value is greater than the said threshold value, the signal at the output of the comparator being used to inhibit the taking into consideration of the said unwanted image.

* * * * *